United States Patent
Ippolito

(10) Patent No.: US 8,152,106 B2
(45) Date of Patent: Apr. 10, 2012

(54) SYSTEM AND PROCESS FOR AUTOMATICALLY CONTROLLING THE FLIGHT OF POWER WING AIRFOILS

(75) Inventor: Massimo Ippolito, Chieri (IT)

(73) Assignee: Kite Gen Research S.L.R., Milan (IT)

( * ) Notice: Subject to any disclaimer, the term of this patent is extended or adjusted under 35 U.S.C. 154(b) by 761 days.

(21) Appl. No.: 12/297,948

(22) PCT Filed: May 10, 2006

(86) PCT No.: PCT/IT2006/000343
§ 371 (c)(1),
(2), (4) Date: Oct. 21, 2008

(87) PCT Pub. No.: WO2007/129341
PCT Pub. Date: Nov. 15, 2007

(65) Prior Publication Data
US 2009/0090815 A1    Apr. 9, 2009

(51) Int. Cl.
F03D 7/00       (2006.01)
F03D 3/00       (2006.01)
H02P 9/04       (2006.01)

(52) U.S. Cl. .................... 244/155 A; 290/44
(58) Field of Classification Search .............. 244/155 A, 244/153 R, 155 R, 190; 290/44, 55
See application file for complete search history.

(56) References Cited

U.S. PATENT DOCUMENTS

| | | | | |
|---|---|---|---|---|
| 3,227,398 A * | 1/1966 | Struble, Jr. | | 244/1 R |
| 4,124,182 A * | 11/1978 | Loeb | | 244/153 R |
| 5,064,148 A * | 11/1991 | Kunze et al. | | 244/153 R |
| 5,931,416 A * | 8/1999 | Carpenter | | 244/155 A |
| 6,072,245 A * | 6/2000 | Ockels | | 290/55 |
| 6,254,034 B1 | 7/2001 | Carpenter | | |
| 6,523,781 B2 * | 2/2003 | Ragner | | 244/153 R |
| 6,578,797 B2 * | 6/2003 | Fischer | | 244/155 R |
| 7,504,741 B2 * | 3/2009 | Wrage et al. | | 290/55 |
| 7,546,813 B2 * | 6/2009 | Wrage | | 114/102.1 |
| 7,656,053 B2 * | 2/2010 | Griffith et al. | | 290/44 |
| 7,672,761 B2 * | 3/2010 | Wrage et al. | | 701/21 |
| 2002/0040948 A1 | 4/2002 | Ragner | | |
| 2007/0157868 A1 * | 7/2007 | Wrage et al. | | 114/365 |

FOREIGN PATENT DOCUMENTS

| | | |
|---|---|---|
| EP | 1 672 214 A1 | 6/2006 |
| GB | 0391602 A2 | 10/1990 |
| IT | TO2003A000945 A | 11/2003 |

(Continued)

OTHER PUBLICATIONS

"Kite Wind Generator, smart control of power kites for renewable energy production" Ippolito, Massimo, prepared Dec. 16, 2003, Sixth Framework Programme.*

(Continued)

*Primary Examiner* — Tien Dinh
*Assistant Examiner* — Joseph W Sanderson
(74) *Attorney, Agent, or Firm* — David A. Farah; Sheldon Mak & Anderson PC

(57) ABSTRACT

A process for automatically controlling the flight of at least one power wing airfoil, through a system for automatically controlling a flight of at least one power wing airfoil, the at least one power wing airfoil being controlled by a driving unit equipped with two winches to which the power wing airfoil is connected by two respective driving cables.

32 Claims, 4 Drawing Sheets

FOREIGN PATENT DOCUMENTS

WO    WO2005100150 A    10/2005

OTHER PUBLICATIONS

Canale, M., M. Milanese, "Robust design of predictive controllers in presence of unmodeled dynamics", European Journal of Control, vol. 9, No. 5, 2003.

Canale, M., M. Milanese, Z. Ahmad, E. Matta, "An Improved Semi-Active Suspension Control Strategy Using Predictive Techniques", Proc. IEEE International Conference on Information & Communication Technologies, Damasco, 2004.

Doyle, J. C., "Guaranteed margins for LQG regulators", IEEE Trans. Aut. Contr, 1978.

Doyle, J. C., K. Glover, P.P. Khargonekar, B.A. Francis, "State space solution to standard H-2 and H-inf control problems", IEEE Trans. Aut. Contr, 1989.

Giarre, L., B. Z. Kacewicz, M. Milanese, "Model quality evaluation in set membership identification", Automatica, vol. 33, No. 6, pp. 1133-1139, 1997.

Hsu, K., M. Claassen, C. Novara, P. Khargonekar, M. Milanese, K. Poolla, "Non-Parametric Identification of Static Nonlinearities in a General Interconnected System", International Federation Automatic Control World Conference, Prague, 2005.

Kacewicz, B.Z., M. Milanese, A. Vicino: "Conditionally optimal algorithms and estimation of reduced order models" Invited paper 2nd Int. Symposium on Optimal Algorithms, New York, 1987. Also Journal of Complexity ol. 4, pp. 73-85, 1988.

Kimura, H., "Robust stabilizability for a class of transfer functions", IEEE Trans. Aut . Contr, 1984.

Malan, S., M. Milanese, D. Regruto and M. Taragna, "Robust control from data via uncertainty model sets identification", International Journal of Robust and Nonlinear Control, Special Issue on "Robust control from data", 2004.

Menga, G., Milanese M., Negro A., "Min-max quadratic cost control of systems described by approximate models", IEEE Trans. Aut . Contr, 1976.

Milanese, M., J. Norton, H. Piet-Lahanier, E. Walter (Eds), "Bounding Approaches to System Identification", Plenum Press, 1996.

Milanese, M., M. Taragna, Int. J. of Robust and Nonlinear Control, Special Issue on "Robust control from data," Eds., 2004.

Milanese, M., G. Belforte: "Estimation theory and uncertainty intervals evaluation in presence of unknown but bounded errors: linear families of model and estimators", IEEE Transactions on Automatic Control, vol. 27, n. 2, Apr. 1982.

Milanese, M., R. Tempo: "Optimal Algorithms Theory for robust estimation and prediction", IEEE Trans. AC, Aug. 1985.

Milanese, M., A. Vicino, "Optimal estimation theory for dynamic systems with set membership uncertainty: an overview", Automatica, vol. 27, 997-1009, 1991.

Milanese, M., M. Taragna, "Optimality, approximation, and complexity in Set Membership H-inf identification", IEEE Transactions on Automatic Control, vol. AC-47 (10) , pp. 1682-1690,2002.

Milanese, M., C. Novara, "Set Membership Identification of Nonlinear Systems", Automatica, vol. 40/6, pp. 957-975, 2004.

Milanese, M., G. Fiorio, S. Malan, "Robust performances control design for a high accuracy calibration device", Automatica, Special Issue on Robust Control, vol. 29, pp. 147-156, 1993.

Milanese, M., C. Novara, P. Gabrielli, L. Tenneriello, "Experimental Modelling of vertical dynamics of vehicles with controlled suspensions", SAE World Congress, Detroit, Michigan, 2004.

Milanese, M., C. Novara, "Set Membership Prediction of River Flow", Systems and Control Letters, vol. 53/1, pp. 31-39, 2004.

Milanese, M., C. Novara, L. Pivano, "Structured SM identification of vehicles vertical dynamics", Mathematical and Computer Modelling of Dynamical Systems (Special Issue), 2005.

Ninness, B. and G. C. Goodwin, "Estimation of model quality", Automatica, 1995.

Zames, G., "Feedback and optimal sensitivity", IEEE Trans. Aut. Contr, 1981-1982.

Zhou, K., J. C. Doyle, K. Glover, "Robust and Optimal Control", Prentice Hall, 1996.

Bhattacharyya, S.P. et al., "Robust Control: The Parametric Approach", Prentice Hall, 1995.

Chen, J. et al., "Control-oriented System Identification: an H-infinity Approach", John Wiley, 2000.

Horowitz, "Synthesis of Feedback Control Systems", Academic Press, 1963.

Kurzhanski, A.B. et al. (Eds), "Modeling Techniques for Uncertain Systems", Birkhauser, 1994.

Partington, J.R., "Interpolation, Identification, and Sampling", Clarendon Press, 1997.

Wahlberg, B. et al., "Hard Frequency-Domain Model Error Bounds from Least-Squares Like Identification Techniques," IEEE Transactions on Automatic Control, vol. 37, No. 7, Jul. 1992.

Internet Citation, [Online], xp002343508, retrieved from the Internet: URL:http://europa.eu.int/comm/research/energy/pdf/other_res_02ippolito.pdf>, retrieved on Sep. 5, 2005.

International Search Report and Written Opinion issued by the International Searching Authority on Feb. 2007 in the parent International Patent Application No. PCT/IT2006/000343.

* cited by examiner

SYSTEM AND PROCESS FOR AUTOMATICALLY CONTROLLING THE FLIGHT OF POWER WING AIRFOILS

CROSS-REFERENCE TO RELATED APPLICATION

The present Application is a national stage of International Patent Application No. PCT/IT2006/000343, titled "System and Process for Automatically Controlling the Flight of Power Wing Airfoils," filed May 10, 2006, the contents of which are incorporated in this disclosure by reference in their entirety.

FIELD OF THE INVENTION

The present invention refers to a process for automatically controlling the flight of power wing airfoils, particularly for optimising the production of electric energy through the flight of power wing airfoils connected to a system of the "carousel" type.

BACKGROUND OF THE INVENTION

As known, there is a wide literature and a relevant number of technical solutions related to the automatic control of the flight of autonomous aircraft (UAV). As known, the chance that a person controls the flight of a wing airfoil, such as for example a kite, mainly derives from the evaluation of position and orientation of a wing airfoil in space by seeing it, which offers the set of perception data which allow modulating the manoeuvre of the traction cables. The automation of the manoeuvre of wing airfoils therefore takes aim at reproducing human sensibility when driving a kite.

Reference art and literature however do not show solutions or studies which deal with the automatic control of the flight of power wing airfoils, in particular realised as "power kite". In fact, it is deemed that the problems involved in this relevant control are multiple and complex, such as to require the most suitable use of the most advanced control methodologies and algorithms. The flight of a power wing airfoil and its modelisation in fact deal with the use of multi-variable non-linear systems, with control specifications to be observed with relevant robustness requirements with respect to parametric variations and to dynamics which cannot be modelled with enough accuracy. Depending on such characteristics, the control system must also provide control calibration functionalities designed on the virtual prototype, using experimental measures on the real system, when realised. The problems posed to the control of real systems by approximations of system mathematical models used for designing the control, have always been taken care of by researchers in the field, from the major works of Nyquist and Bode. It is however only starting from the 70's-80's that a relevant development of results occurred, able to systematically and quantitatively deal with the effect of the uncertainty of models used for analysing and synthesizing the control systems, giving rise to the development of the "robust" control area. Since these methodologies can be used for solving the majority of real problems, it is necessary to enact suitable identification methods which operate on measures performed on the real system to be controlled, designated in reference literature as robust identification, control-oriented identification or set membership identification.

Currently, no systems and/or processes are known for automatically controlling the flight of power wing airfoils which operate in a predictive way, namely, depending on observation and forecasts of future flight conditions of the wing airfoils themselves, and which allow taking into account critical situations and errors due to prediction.

SUMMARY OF THE INVENTION

Therefore, the object of the present invention is solving the above prior art problems, by providing a-process for automatically controlling the flight of power wing airfoils in a predictive way of a "preferred control strategy" based on observation and prevision of future flight conditions of the wing airfoils, taking into account critical situations and errors due to prediction, allowing to avoid local maxima, oscillations and driving instabilities.

The above and other objects and advantages of the invention, as will appear from the following description, are obtained with a process for automatically controlling the flight of power wing airfoils as claimed in the present invention.

Preferred embodiments and non-trivial variations of the present invention are the subject matter of the dependent claims.

BRIEF DESCRIPTION OF THE DRAWINGS

The present invention will be better described by some preferred embodiments thereof, provided as a non-limiting example, with reference to the enclosed drawings, in which:

FIG. 4b shows a plan view of the diagram in FIG. 4a;

DETAILED DESCRIPTION OF PREFERRED EMBODIMENTS OF THE INVENTION

For the sake of brevity, a detailed description of the components which will be mentioned below and are common with the known system of the "carousel" type can be found in published applications. It is however wholly clear that the system and the process of the present invention can be used also for other applications, different from the system of the "carousel" type, by performing modifications which are anyway within the reach of any skilled person in the art.

Figure 1:
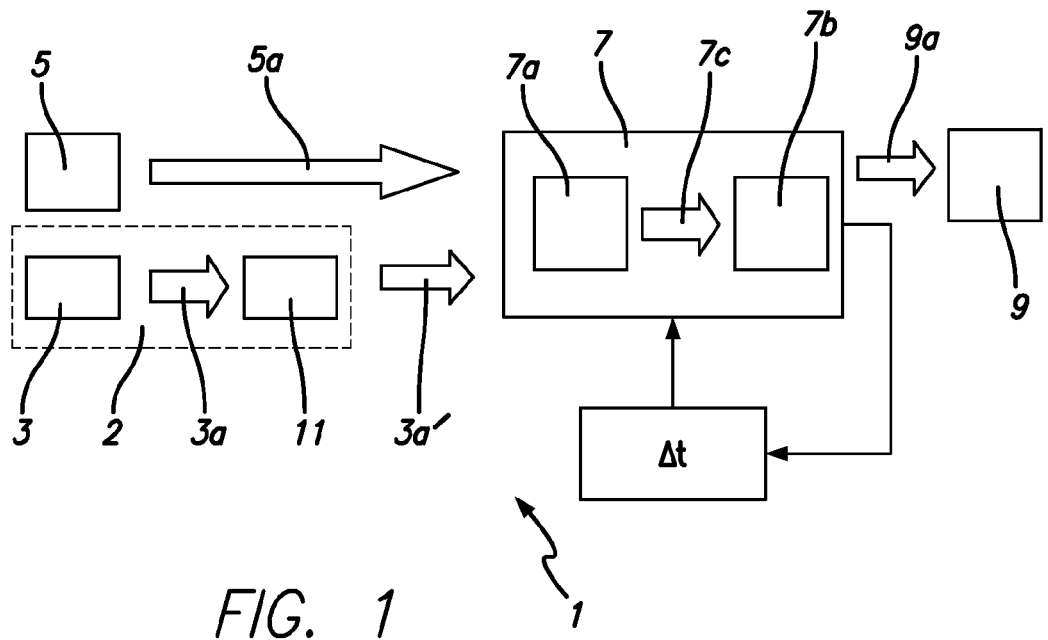
FIG. 1 is a block diagram showing the main components of the system for performing the process of automatically controlling the flight of power wing airfoils of the present invention.

With reference to FIG. 1a, it is possible to note that the system 1 for automatically controlling the flight of at least one power wing airfoil 2 of the present invention comprises:

first detecting means 3 on board the power wing airfoil 2 adapted to detect first pieces of information 3a dealing with at least position and orientation in space of the airfoil 2 itself and three-axes accelerations to which it is subjected;

second detecting means 5 on the ground adapted to detect second pieces of information 5a dealing with at least the amount of tension on driving cables of the wing airfoil 2 and the position of the counterweight of the driving unit 9;

processing and controlling means 7 of the first 3a and second 5a pieces of information, adapted to transform the contents of such pieces of information into a mechanical drive operating on the winches of the driving unit 9 to drive the wing airfoil 2 along a flight trajectory which maximises the "lift" effect generated on the wing airfoil 2 by the Aeolian current in which it is immersed and maximises the amount of kinetic energy subtracted from the Aeolian current; in fact it is possible to demonstrate that, if the power wing airfoil is free of scanning the wind front of the Aeolian current in a "lift" mode, not only the traction which it can exert on the driving cables (and therefore possibly on the "carousel" system arms) is enormously greater than the one exerted by keeping the wing airfoil still in the maximum wind resistance point by exploiting the "drag" effect, but the area in which the wing airfoils have a braking effect on the rotation of the possible "carousel" system is wholly removed; in particular, the processing and controlling means 7 comprise a geometrical motor 7a adapted to process such first pieces of information 3a to return information 7c about position, acceleration and orientation of the wing airfoil 2 to a numeric control 7b, of a substantially conventional type, adapted to operate 9a on the winches of the driving unit 9 to control the traction force on the driving cables; and a transmission system of the first pieces of information 3a to the processing and controlling means 7, and in particular to the geometrical motor 7a.

Moreover, the system 1 of the present invention could comprise an instability dissipation drive realised of the robust control theory.

Figure 2A:
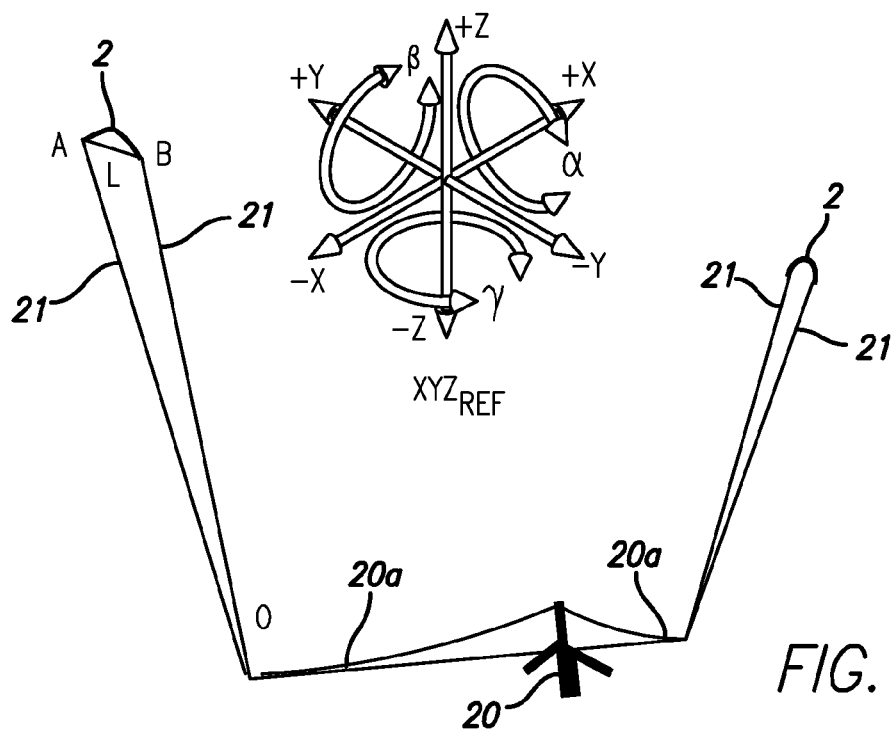
FIG. 2a is a diagram showing a reference system related to a power wing airfoil constrained to a known system of the "carousel" type.

In order to better understand the modes with which the first pieces of information 3a are directly collected by the first detecting means 3, which other pieces of information can be indirectly obtained from the first pieces of information 3a and consequently which types of first detecting means 3 can be used in the system 1 of the present invention, it can be useful to briefly examine the geometric piece of information which characterises the position of the wing airfoil 2 in space. With reference therefore to FIG. 2a, it is possible to note that each wing airfoil 2 goes out of an arm 20a of a system 20 of the "carousel" type through the two driving cables 21 constraining it to the ground and the imaginary line L which joins its ends, a triangle OAB laying on a plane in space. The aerodynamics study introduces the concepts of roll, pitch and yaw, in general of the aircraft attitude. In case of a wing airfoil 2, there is a constraint represented by the output nozzle of the driving cables 21 from the arm 20a which makes the classical terminology (yaw, roll, pitch) useless. Let us then take into account an ideal reference coordinate system $XYZ_{ref}$ integral with the arm 20a of the system 20, so that the gravity acceleration has a component along only one axis Z. Let us further take into account the imaginary line which joins the arm 20a end to the medium point of the wing airfoil 2. This segment, stated above, describes an angle α, with the horizontal plane $XY_{ref}$, and an angle γ which can be located starting from axis $X_{ref}$ by projecting the segment on the horizontal plane $XY_{ref}$. Angles α and γ define the position of the wing airfoil 2 in space. The geometric piece of information is however complete only when the orientation concept is also introduced. In order to define it, let us take into account again the above described triangle. The triangle OAB lays on a plane whose position with respect to the ground reference system changes in time depending on the wing airfoil 2 flight. The term orientation of the wing airfoil 2 therefore defines the angle θ described by the plane on which the triangle and the horizontal plane $Xy_{ref}$ lay, apart from the angles α and γ. Though in order to deduce position and orientation of the wing airfoil 2 in space, an artificial ground optical view system can be adopted, this could be constantly impaired by the possible transit of clouds or the lack of a limpid atmosphere, these problems being still more felt if the system 1 is used together with the system 20 of the "carousel" type characterised by high operating flight heights of the wing airfoil 2.

Preferably, therefore, in order to deduce position and orientation of the wing airfoil 2 in space and accelerations to which it is subjected, the first detecting means 3 comprise three-axes accelerometers of the MEMS type in combination with at least one electronic compass. This latter one can be realised with a magnetometer, of the Fluxgate type or another type, able to provide a reliable solution, much more accurate than what could be obtained by the artificial view even under perfect visibility conditions. In particular, the wing airfoil 2 is equipped with at least one magnetometer and at least two three-axes accelerometers placed at the ends of the wing airfoil, preferably next to where the driving cables join the walls of the wing airfoil. Accelerometers on board the wing airfoil therefore solve the functions of:

providing the system 1 with the capability of recognising position and orientation of the wing airfoil in space;

supplying multidimensional and instantaneous acceleration data, useful for the correct feedback of the control loop of the process of the present invention, described below, implemented through the system 1;

correcting the possible false perception of the gravity vector, caused by strong aerodynamic accelerations.

Magnetometers complete the provision of pieces of information with the only one which is necessarily not within reach of the system of accelerometers, namely the wing airfoil 2 rotation around the gravity axis.

Accelerometers of the type used in the system 1 are sensitive to a wide spectrum of accelerations which range from static acceleration, such as gravity acceleration, to phenomena with frequency characteristics of a few kHz.

Figure 2B:
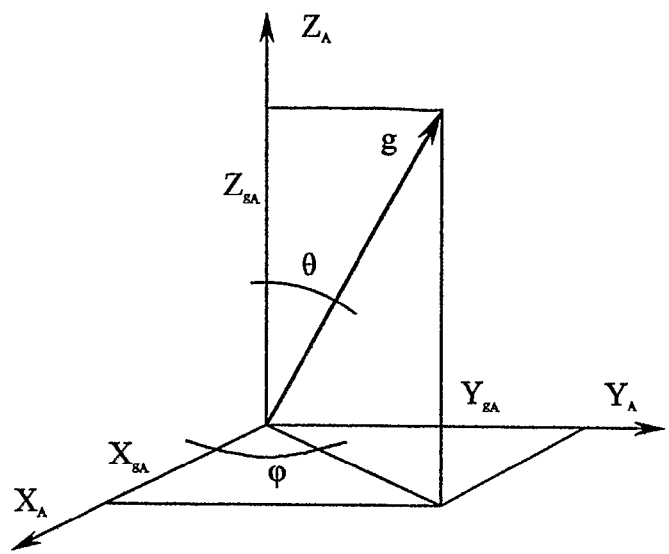
FIG. 2b is a graph showing the vector decomposition of a vector showing a gravity acceleration.

The three-axes accelerometer obviously defines a reference Cartesian system $XYZ_A$ of its own, like the one shown in FIG. 2b. By imagining an instant in which such reference system coincides with the ideal reference Cartesian coordinates system $XYZ_{ref}$, the sensitivity to gravity (static) acceleration allows de facto to distinguish an acceleration variation when the accelerometer is only slanted (which implies a variation of direction $Z_A$ with respect to $Z_{ref}$) from a variation due to the actual displacement of the reference system $XYZ_A$ origin, defined as aerodynamic acceleration and which represents the flight of the power wing airfoil.

In general, the three-axes accelerometer will have a casual position in space. The vector g which describes the gravity acceleration, with a constant modulo, direction and sense, can therefore be decomposed into its three components along the versors parallel to the three axes $X_A, Y_A, Z_A$. Obviously, the gravity vector g position in the coordinates system $XYZ_A$ can also be expressed in spherical coordinates, depending on the angles ϕ and θ and the modulo of g (9.8 m/s²), through the following change of coordinates:

$X_{gA} = g*\cos\phi*\sin\theta$ $Y_{gA} = g*\sin\phi*\cos\theta$ $Z_{gA} = g*\cos\theta$ from which the following is obtained:

$$\phi = a\tan^2(X_{gA}, Y_{gA})$$

$$\theta = a\sin(X_{gA})$$

where a $\tan^2$ is the arc tangent(x) function with the ambiguity resolution $(+/-)\pi/2$.

Each accelerometer is subjected to two acceleration contributes. The gravity acceleration, described above, is summed as vectors summed to the aerodynamic acceleration due to the actual motion of the wing airfoil with respect to the fixed reference system $XYZ_{ref}$. The first detecting means 3 can therefore be adapted to implement, in their own computing means aboard the wing airfoil, suitable algorithms whose purpose is distinguishing gravity acceleration from aerodynamic acceleration, communicating on one hand the spherical coordinates which point out the gravity vector decomposition with respect to the accelerometer coordinates system (and therefore the accelerometer being slanted with respect to the fixed reference system), and on the other hand, the real-time evaluation of the aerodynamic acceleration. The measure of such acceleration allows, first of all, to implement real-time control techniques which are mandatory for promptly driving the flight of the wing airfoils, as will be seen afterwards in the description of the control process of the present invention. Such measure further allows instantaneously correcting the necessary angles φ and θ A for evaluating the orientation of the accelerometer, while the integration of acceleration data allows a further evaluation of the flight trajectory of the wing airfoil, de facto completing all information related to the knowledge of the wing airfoil.

The need of providing the wing airfoil with at least two accelerometers derives from the fact that it is necessary to distinguish those movements of the wing airfoil which can be deemed as rotations around one of its ends. In this case, only one accelerometer assembled, for example, at the wing airfoil centre, would perceive a tangential speed which can be approximated with $v_t=\omega \cdot r$, where ω is the rotation speed of the relevant circular motion, while r represents the accelerometer distance from the rotation centre (in this case, half the width of the wing airfoil). Such speed does not correctly describe the wing airfoil motion, whose "free" end describes a circular trajectory with double tangential speed $v_t=\omega \cdot r$ and centripetal acceleration equal to $a_c=v_t^2/r$. The two accelerometers arranged on the wing airfoil therefore are the components of an inertial six-axes platform with high performance and high cutting frequency, which is able to recognise movements on six axes and describe position and orientation of the wing airfoil itself.

Rotations around an axis which do not imply variations in the axis direction which is parallel to $Z_{ref}$ can however be perceived by this configuration of accelerometers only as an integration. It is therefore necessary to provide the wing airfoil with at least one magnetometer for compensating the drift due to the double integration. The two accelerometers together with the output point of cables 21 from arm 20a describe a completely known triangle, the length of each side being known. The only unknown data is the angle included between arm and pair of cables 21 (consider the bisecting line of the acute angle included between the two cables 21) projected on the horizontal plane $XY_{ref}$. Such angle can be more comfortably evaluated from ground, by directly measuring it on the output point of cables from the arm.

As stated, the second detecting means 5 are adapted to detect the second pieces of information 5a dealing at least with the amount of tension on the driving cables of the wing airfoil 2 and the position, actual or emulated by the winches of the driving unit 9, of the counterweight; in particular, function of the counterweight is potentially or electrically absorbing and storing the excess energy which can be generated due to a-too strong a wind, and return it in the phases in which the wing airfoil is under stall conditions with respect to the wind. The second detecting means 5 can therefore comprise "strain gauges" for measuring the deflection of the driving cables and encoders on the winches of the driving unit; such encoders, possibly associated with an alternate motor, can also be used for detecting the length of the driving cable unwound from the winches, and consequently the distance from the wing airfoil to the driving unit, and the differential length between the two driving cables of a same wing airfoil. Moreover, the second detecting means 5 can also comprise proximity sensors adapted to detect the angle between the driving cables at the outlet of the arm nozzle of the "carousel" system.

The second detecting means 5 can also comprise the optical or microwave ground artificial vision system, for the wing airfoil position. The ground optical view, with respect to the microwave view, has the non-neglectable disadvantage of depending on the transit of clouds which hide the wing airfoil from view. An efficient artificial view system however provides an important contribution in terms of safety, supplying necessary information to avoid collisions with helicopters and small aircraft in general.

From the first 3a and second 5a pieces of information respectively measured by the first 3 and second 5 detecting means, the wing airfoil position in space can anyway be obtained in at least three different ways:
a) processing of data coming from accelerometers and magnetometers through the geometrical motor; in particular, the length of the wing airfoil position vector can be obtained through the double integration of the acceleration signal;
b) combining data which can be obtained from the encoders of the winches with the measure of angles between cables and arm which can be obtained at the arm end; it must be noted that from the arm end, only those angles which are generated by the pair of driving cables, as a whole, generate with the arm itself, can be evaluated;
c) using the artificial view system: in this case, however, the delay due to acquiring and composing the images must be added to the delay of deriving information.

Similarly, the wing airfoil orientation in space can be obtained both by processing accelerometer data and by means of the artificial view system.

Acceleration, instead, must necessarily be obtained on board the wing airfoil, due to the fact that the delay introduced by computing the second derivative from the position is incompatible with the real-time control techniques which are mandatory for driving the wing airfoils flight. This implies that a smart system on board the wing airfoil becomes an integral part of the control system 1.

In an alternative embodiment, it is also possible to provide for the use of rheological polymers in the wing airfoil structure, with the purpose of realising actuating systems directly on board; in such case, it is possible to provide that the first detecting means comprise other sensors which are able to provide signals derived by feedback from composite materials in order to contribute to or detect the wing airfoil position in space.

Due to what is stated above, the measure of wing airfoil position and orientation will therefore possibly be redundant; in particular, the acceleration evaluation starting from direct position and orientation information, though not being efficient in terms of real-time redundancy, can contribute to form the diagnostic redundancy of the system for evaluating the flight characteristics of the wing airfoil.

In this context, particular relevance can be given to inventive methodologies for designing virtual sensors placed together with the first and/or second detecting means of the system 1. Actually, many of the quantities measured by the sensors of the first and second detecting means could, in case of failure of the specific sensor, also be estimated from the measures of the other sensors through observers/Kalman filters designed depending on an adequate model of the dynamic behaviour of wing airfoils. The advantages of being able to perform desired redundancy levels by using virtual sensors in place of some of the real sensors are evident, in general depending on physical sensor costs and on problems about installation and communication with the control system. These advantages are particularly relevant for sensors on board the wing airfoils, in which advantages are added in terms of weight and energy consumption. In such sense, experiences can be integrated deriving from the application of virtual sensors in the aeronautic and automotive fields.

The numeric control 7b which drives the wing airfoils needs reliable and real time acceleration and position information. In particular, three-axes accelerations which describe the behaviour, in the three-dimensional space, of the wing airfoil, must necessarily be acquired on board the wing airfoil itself, therefore at a height.

It follows that it is necessary that the transmission system of the first pieces of information 3a between wing airfoil and processing and controlling means 7 complies with strict specifications in terms of performance and energy absorption. In order to comply with such requirements, and preferably excluding the most obvious galvanic connection between wing airfoil and ground processing and controlling means 7 in order to prevent a favourable path for possible atmospheric discharges from being obtained, the transmission system can be integrated in the driving cables of the wing airfoil through at least one data optical fibre.

The insertion of optical fibres in cables must however take into account that the driving cables are generally with a fibre with high modulus and that the working environment is difficult both for kevlar and for UHMW polyethylene. As known, kevlar can have seepages and tend to absorb water, which could imply an increase of electric conductivity in case of acid rains or local pollutants, making it necessary to use protecting sheaths or braids, for example made of THFT, which would also perform an abrasion-prevention function. In this case, the natural placement of the optical fibre would be between sheath and bundle of fibres, paying attention to give a certain freedom in length in order not to subject the optical component to the same elastic distortions of the cable.

In case of UHMW polyethylene, the considerations given for kevlar remain valid, but the problem of its application must be added, the so-called "creep", namely the irreversible elongation in time under efforts, which would impose a frequent replacement of cables equipped with optical fibres, thereby reducing the actual working time. There are however materials which can be associated with polyethylene, which reduce the problem, which can be taken into account in combination with the possible weaving of the optical fibre inside the UHMW bundle itself. It is however necessary to underline that the section increases with the diameter square, and therefore the cables workload, should be easily dimensioned depending on the maximum required force, without incurring in creep and without increasing the aerodynamic drag force, namely the resistance that the cables give to air penetration. Moreover, a wing airfoil geometric modelling of the cable section in order to make them assume shapes with lower drag and more lift, could be a useful solution.

Other optical fibres in cables could be used for power supplying the first detecting means on board the wing airfoil. Introducing, in a multimode low-loss fibre, a sufficient amount of light on the ground side, light could be reconverted through a micro photovoltaic module, for example made of GaAS, on the wing airfoil side.

Alternatively, the transmission system can allow the transmission of the first pieces of information in radio-frequency, such solution certainly appearing as the most natural method for a communication which needs avoiding electric connections, but can be demanding from the energetic point of view.

Even if the optical fibres solved the transmission of information, it can anyway be mandatory to keep the additional resource represented by the radio-frequency transmission for redundancy reasons. If the radio communication represents therefore a backup solution with respect to the communication through optical fibres, a watchdog could command its activation, being careful to possible interruptions of acknowledgements of optical flows.

Obviously, the radio-frequency transmission system can use an extremely wide variety of communication protocols to send the first pieces of information to the ground processing and controlling means. By using for example a monodirectional continuous stream protocol, the low communication level, the physical layer, would be the radio-frequency mediator, which can be a simple FSK modulator of digital information provided by sensors and continuously active, however implying a continuous energy absorption. It is however possible to provide some solutions for reducing necessary time and power for transmitting information, such as what follows:

high-gain directional antennas: an antenna which does not add resistance to the air flow can be obtained with leads complying with existing geometries: the suitable places can be the length of cable next to the wing airfoil, or the wall of the wing airfoil. These two placements would have the advantages of being always directed towards the driving unit, which would house the corresponding receiving antenna communicating with the processing and controlling means;

carrier suppression: it is a solution known as single side band transmission which allows high energy savings, however reducing the bit-rate which can be transmitted;

asynchronous activation: this solution requires a special software on board the transmitter which evaluates the meaning of data stream, transmitting information only in the most meaningful times, by adopting the concept of video compression key frames. The advantage would be important, because energy demand reduction factors could be obtained which can be computed similarly to data compression factors.

Alternatively, a datagram packet protocol can be used, like the one which is used in Internet for transferring data flows without the characteristic sequence and validity checks, suitable for films and radio broadcasting. Since the protocol is bi-directional, the burden of checking communication rhythm and related electric absorption could be transferred to the receiving station control, which could query the sensors only in case of need or to re-align the dynamic model of the control system with the real status.

Alternatively, an asynchronous negotiated transport protocol can be used, which is more complex to implement, but is able to join together all advantages of the above described solutions. It is in fact a very light and nervous bi-directional protocol which could originate the communication both from the side of the first detecting means and from the side of the processing and controlling means. The absence of a stack brings about the fact of not having latencies which could impair the bit-rate.

In a further alternative, it is possible to provide for the use of an ultrasound transmission system.

Anyway, the two accelerometers together with the magnetometer on board the wing airfoil produce seven information flows at thousands of samples per second. Such stream of raw data from the wing airfoil towards ground, in addition to be excessive for transmission, is substantially useless for the geometrical motor: the geometrical motor must in practice cycle with a frequency compatible with system size and time constants, continuously providing the updated position data to the numeric control, and requires more reasoned data as input. For such purpose, it can be provided to use pre-processing means 11 adapted to perform a pre-processing of all or part of the first pieces of information 3a on board the wing airfoil to provide pre-processed first pieces of information 3a' adapted both for transmission and for an easier processing by the geometrical motor 7a. For such purpose, the accelerometers can be equipped with integrated pre-processing DSP (Digital Signal Processing) means 11.

Moreover, as previously stated, the accelerometers of the MEMS type used for collecting useful information for knowing the flight trajectory of the wing airfoil are sensitive both to static accelerations (gravity) and to dynamic accelerations. Having to use the gravity (static) acceleration for measuring useful angles for obtaining position and orientation of the wing airfoil, there occurs the problem of insulating the static acceleration from intense aerodynamic accelerations to which the wing airfoil is subjected. This activity can be performed by a suitable algorithm which must necessarily cycle at speeds which are incompatible with the transmission speed made available by the transmission system and must therefore be implemented by the pre-processing means 11 on board the wing airfoil.

The system 1 of the present invention further comprises at least one supplying system of the first detecting means and of the components of the transmission system on board the wing airfoil; obviously, such first means and components could be self-supplied through their own batteries. It is however necessary to take into account the fact that the system 1 of the present invention, above all if used in association with the "carousel" system, could require very high energy autonomies, in order to avoid to have to take the wing airfoil to ground with too much a frequency to replace or recharge the batteries, with the consequent burden of having to stop the operation of the "carousel" system. Moreover, it is useful to take into account that the system 1 should be able to operate in contact with natural forces and events, such as rain, snow, ice, great wind variations, atmospheric discharges, day, night, sun. In order to make available the limited energy demand on board the wing airfoil, alternative solutions have been provided to the self-supply, which exploit sun and apparent wind elements. The supplying system in fact can comprise photovoltaic thin-film modules, on a plastic support, which can be advantageously applied on the wing airfoil without modifying its aerodynamic characteristics and weight. These modules should obviously produce a sufficient amount of energy to supply the on-board electronics, increasing the recharging capability of possible accumulators during the night.

Alternatively, it is possible to exploit the apparent wind flow which is always available around the wing airfoil; the supplying system could therefore comprise at least one Aeolian micro-turbine keyed-in to a small permanent magnet generator and supplied by the apparent wind.

The present invention further refers to a process for automatically controlling the flight of power wing airfoils, preferably through a system 1 like the previously described one. In particular, the process of the present invention operates predictively of a "preferred control strategy" based on the observation and prediction of future flight conditions of the wing airfoils, taking into account critical situations and errors due to prediction, allowing to avoid local maxima, oscillations and wing airfoil driving instability. As previously seen, the system 1 of the present invention is configured in such a way that the processing and controlling means 7 acquire as input information such as position, accelerations, forces and other geometrically defined quantities, process them, and as output operate on the winches which control the flight trajectory of the wing airfoil.

Figure 3:
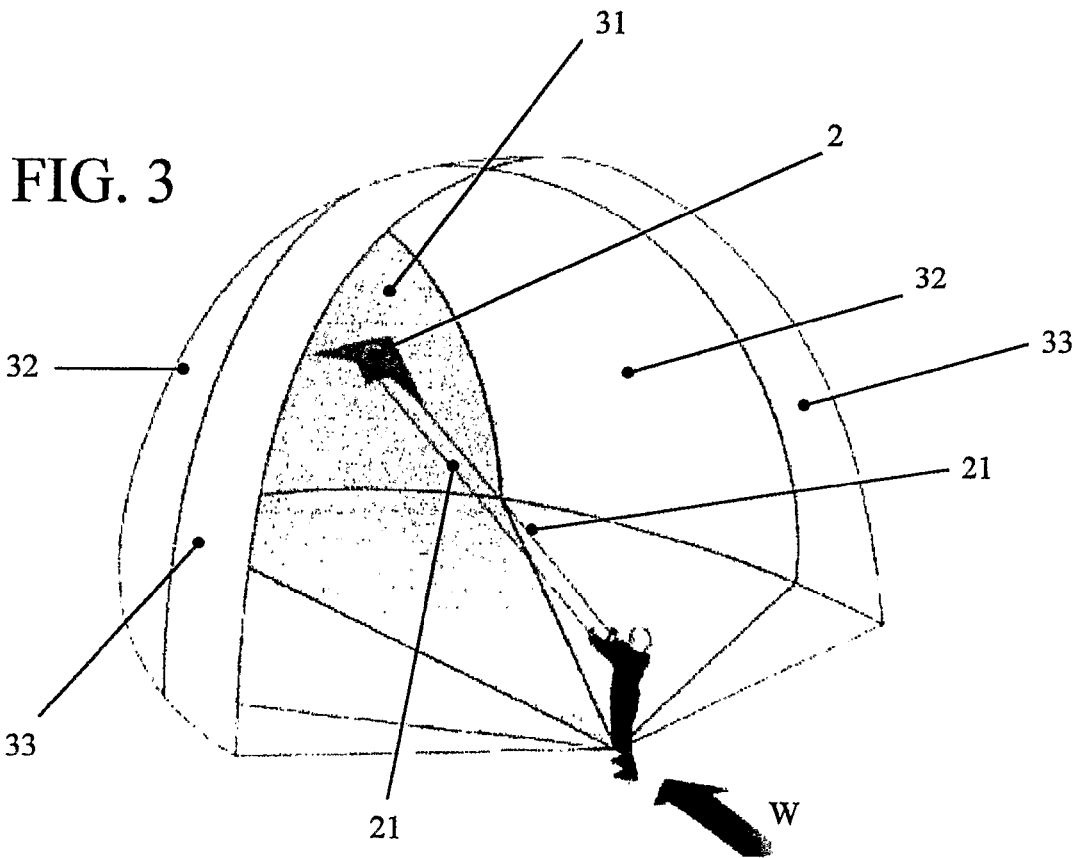
FIG. 3 is a diagram showing the navigation area of a power wing airfoil with respect to direction and sense of an Aeolian current.

In order to better describe the logic for implementing the process of the present invention, it is useful to deal again with the behaviour dynamics of the wing airfoil. With reference in particular to FIG. 3, it is possible to schematically note the conditions of the wind front or of the Aeolian current W which the wing airfoil 2 is able to intercept, in following instants, with respect to a reference integral with the constraint point of the driving cables 21 to ground. FIG. 3 describes, in fact, a quarter of a sphere which is the navigation area of the wing airfoil 2, at the centre of which the so-called "powerzone" 31 is defined, in which the wing airfoil 2 expresses the maximum traction on driving cables 21. By going away from the "powerzone" 31, through a zone 32 of the window which can be navigated by the wing airfoil 2 in which the traction on the driving cables 21 is progressively reduced, an edge 22 of the window which can be navigated by wing airfoil 2 is reached, in which the traction on the driving cables 21 is highly reduced.

Figure 4A:
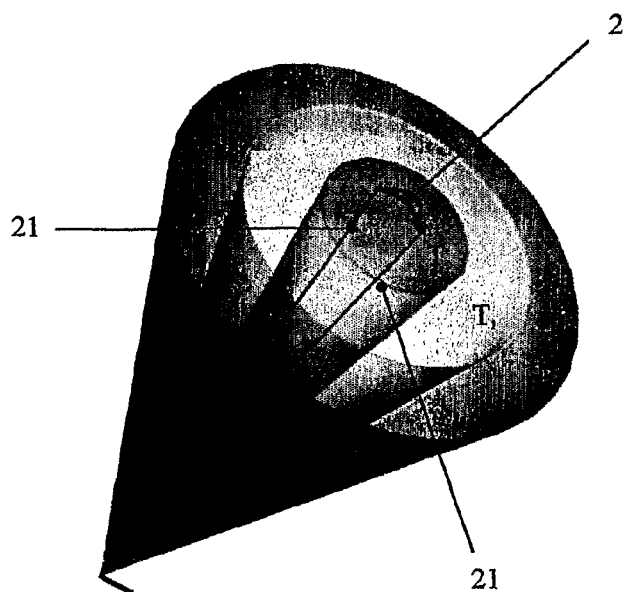
FIG. 4a is a diagram showing a three-dimensional flight target of a power wing airfoil of the process of the present invention.
Figure 4A:
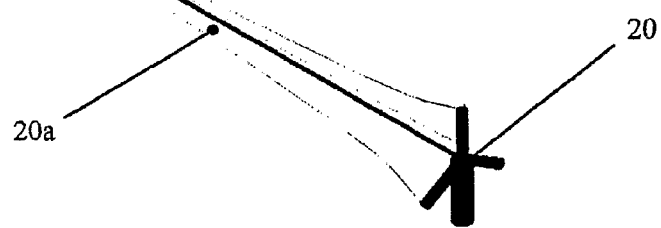
Figure 4B:
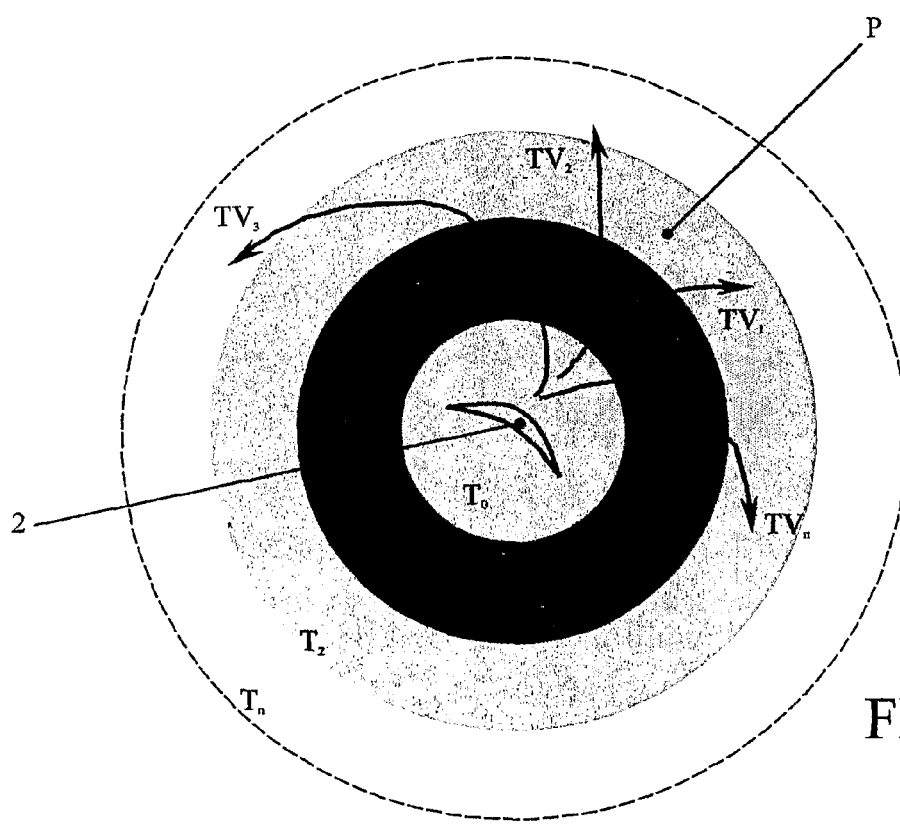

With reference to FIGS. 4a and 4b, imagine now to take into account, in the current instant, the wing airfoil 2 placed at the centre of an ideal "target" plane P, univocally defined as normal to the bisecting line of the angle formed by the two driving cables 21. The process of the present invention, by operating through the system 1, can decide if the wing airfoil 2 must perform any one of the possible flight trajectories $TV_1$, $TV_2$, $TV_3$, ..., $TV_n$, starting from the current position at the centre of plane P. On this plane P, it is possible to divide the flight trajectories which the wing airfoil 2 can travel depending on the necessary time $T_0$, $T_1$, $T_2$, ..., $T_n$, to reach each point. In particular, it is possible to take into account following time intervals which correspond to following angular positions of the arm 20a of the "carousel" system 20. The flight trajectory of the wing airfoil 2 will thereby occur synchronously with the movement of the arm 20a.

For easiness, let us consider in particular FIG. 4b with coordinates related to the wing airfoil 2. The Cartesian reference system is integral with the wing airfoil 2 and, with the wing airfoil 2, the Cartesian reference system moves into space. The wing airfoil 2 is therefore always at the centre of plane P. Only times flow. The diagram does not point out the point in which one has to go, since it is a future evaluation. When the first time interval $T_0$ has elapsed, the reference system integral with the wing airfoil draws again a "target" which is wholly similar to the previous one, with the only difference that time $T_1$ has become $T_0$, and so on. $T_1$ represents therefore the set of points which can be reached by the wing airfoil 2 in its flight trajectory in 1 step, $T_2$ the set of points which can be reached in 2 steps, and so on. The wing airfoil 2 is anyway always at the centre of the "target" plane P.

For easiness, FIGS. 2a and 2b show as an example the "target" plane P till time $T_2$, but obviously the number n of steps which can be observed can be different.

In order to evaluate its own control strategies and choose a flight trajectory which the wing airfoil must perform, the process of the present invention uses flight and control parameters.

Figure 5:
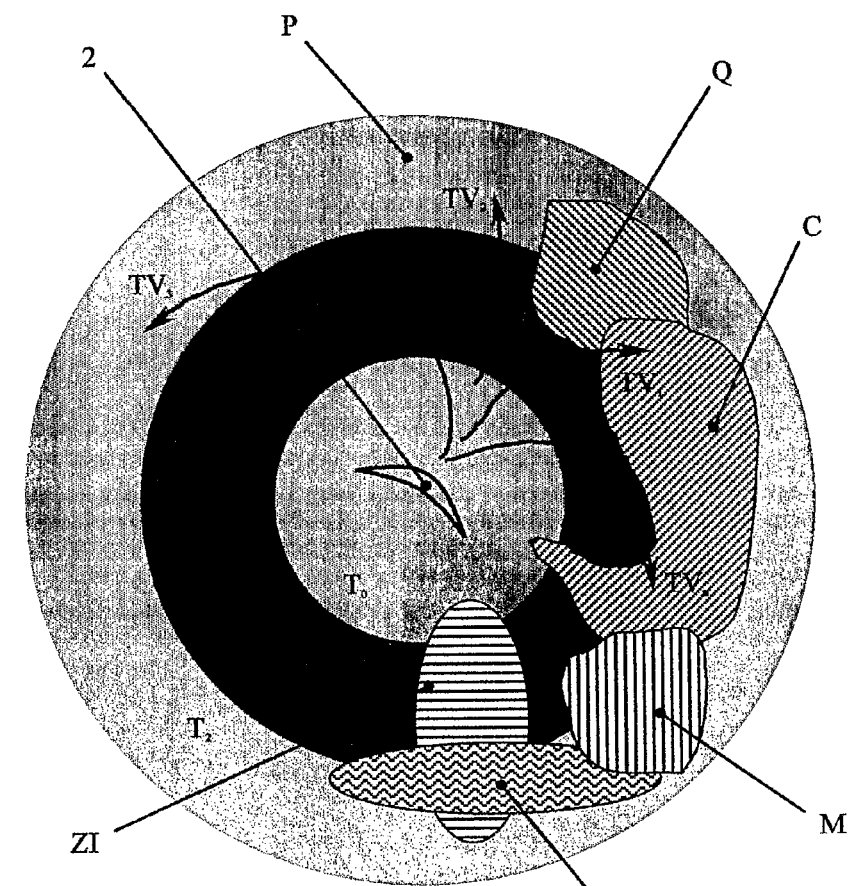
FIG. 5 shows the diagram of FIG. 4 equipped with some parameters of the process of the present invention.

With reference therefore to FIG. 5, it is possible to note the "target" plane P on which some flight and control parameters are graphically included for the process of the present invention.

Figure 6:
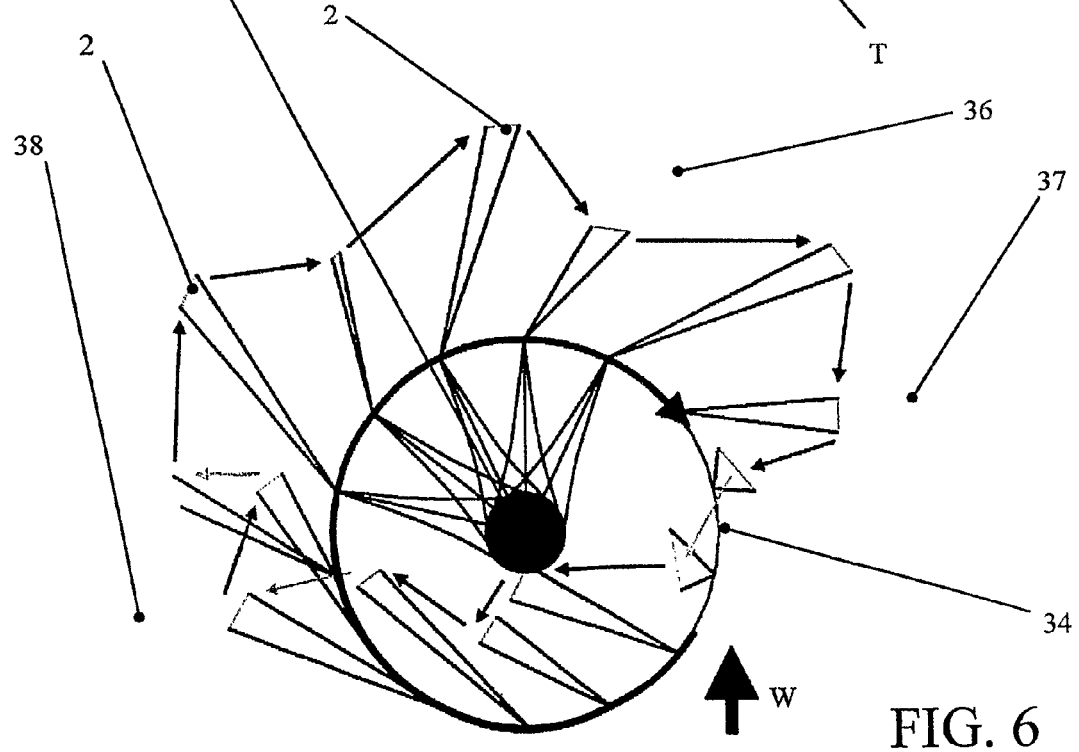
FIG. 6 shows a top view of the known system of the "carousel" type in some flight steps of a wing airfoil driven through the system and/or the process of the present invention.

FIG. 5 shows how the parameters in simplified form change in space, having reduced the complexity of roto-translations of the "carousel" system in a model integral with the reference system of the wing airfoil 2. Morphology and characteristics of such parameters are an essential part of the information which allows the control to decide the flight strategy of the wing airfoil 2. It is in fact possible in this way to represent optimal motion, direction and position for reaching the ideal height Q in order to have the best wind, or which is the best angle of incidence with respect to the wind, but at the same time it is possible to represent other parameters, such as for example desirable maximum traction area T, interdiction areas ZI (areas in which there are, for example intolerable structural stress situations, instability, excessive forces) and the functional parameters of the system 1, such as areas in which the counterweight C, which is used to keep the flight parameters of the wing airfoil 2 constant and to quickly adjust the length of the driving cables (dynamic length), is kept at half its own dynamic values. The graph C corresponding to the counterweight, for example, can assume useful positions to lift the counterweight or to make the counterweight descend. Also the driving unit winches could be subjected to parameters, since they point out the absolute cables length. The graph of the height parameter Q, instead, represents the optimum area for height problems. The graph of the manoeuvre parameter M, instead, represents the optimum area to perform the most important manoeuvre in the flight of the wing airfoil 2 defined as azimuth gybing, which consists in a sudden manoeuvre during which the wing airfoil 2 is driven into a quick transition between flight traverses. With particular reference to FIG. 6, it is possible to note that, in general, if power wing airfoil 2 is free of scanning the wind front, not only is the traction which it can exert on the driving cables (and therefore on the arms of the "carousel" system 20) much greater than the one exerted keeping the wing airfoil unmoving in the maximum wind resistance (drag) point, but the area in which the wing airfoils have a braking effect on the "carousel" system 20 rotation is completely removed. In the upwind area 37, or bowline, the capability of driving the flight of the wing airfoil 2 allows performing the azimuth gybing, which consists in a quick transition between the two traverses 36 and 38, during which the wing airfoil 2 travels in air a distance equal to at least three times the arc of circumference 34 affected in time in which the "carousel" system 20 travels along such arc. The flight control must take care that the manoeuvre, in addition to be quickly performed, has in no way a negative influence in producing energy. In FIG. 6, the position of each wing airfoil is random, namely the image has to be deemed as a top snapshot of the operation of the "carousel" system. In this configuration, each wing airfoil is free of searching the maximum wind intensity, avoiding the exhausted wind front areas for the passage of the immediately previous wing airfoil.

The dimension of each graph (height, counterweight, etc.) is proportional to the allowed tolerance to the related parameter. Each parameter has in turn a relative weight $P_Q$, $P_C$, $P_M$, $P_{ZI}$, $P_T$, a relative height with respect to all heights, which will be described below.

From the plane P shown in FIG. 5, once having performed the manoeuvre and once the time interval $T_0$ has elapsed, one passes to a new plane P, re-computed for the following decision. If global situations are constant, the graphs related to each parameter tend to be concentrated. The choice of graphically representing the optimum areas for each considered parameter is the method for solving the ambiguities and understanding which decision must be chosen. Such strategy is useful to prevent local maxima, namely positions which seem to be the best, but they are not.

The process has always information available, in a direct form or a form derived from the first and second pieces of information detected by the detecting means of the system 1, related to the flight height of the wing airfoil, to the counterweight dynamics, to traction values, to the safety computation in interdiction areas, to the time in which manoeuvres must be made. Let us take into account, for example, the most important manoeuvre in the flight of the wing airfoil, which has been defined as azimuth gybing. Deciding whether to perform it can be a triggered event: under such conditions, in fact, the process of the present invention can provide for an emergency phase in which the wing airfoil is shown which manoeuvre must be done with maximum priority. It is not to be excluded that a far-sighted strategy automatically devises the manoeuvre without the need of suggesting it. If a good evaluation time depth is reached, the gybing will occur at an ideal time computed depending on current information and parameters, since presumably this is the most intelligent action not to remove traction, not to lose dynamics on the counterweight and to comply with a certain height without going into interdiction areas.

The process step, which decides at every step which direction the flight trajectory of the wing airfoil can take, can be visually represented as a matrix, like the one in the following Table 1, containing, for each parameter, the best coordinates XY at times $T_0$, $T_1$, $T_2$, ..., $T_n$, on the normal plane with respect to the driving cables barycentre.

TABLE 1

| Parameter | Weight | $T_0$ | $T_1$ | $T_2$ | ... | $T_n$ |
|---|---|---|---|---|---|---|
| Height | $P_Q$ | $QX_0Y_0$ | $QX_1Y_1$ | $QX_2Y_2$ | ... | $QX_nY_n$ |
| Counterweight | $P_C$ | $CX_0Y_0$ | $CX_1Y_1$ | $CX_2Y_2$ | ... | $CX_nY_n$ |
| Traction | $P_T$ | $TX_0Y_0$ | $TX_1Y_1$ | $TX_2Y_2$ | ... | $TX_nY_n$ |
| Interdiction areas | $P_{ZI}$ | $ZIX_0Y_0$ | $ZIX_1Y_1$ | $ZIX_2Y_2$ | ... | $ZIX_nY_n$ |
| Manoeuvre | $P_M$ | $MX_0Y_0$ | $MX_1Y_1$ | $MX_2Y_2$ | ... | $MX_nY_n$ |
| Resultant | | $RX_0Y_0$ | $RX_1Y_1$ | $RX_2Y_2$ | ... | $RX_nY_n$ |
| PT | | $PT_0$ | $PT_1$ | $PT_2$ | ... | $PT_n$ |

The matrix in Table 1 therefore contains desired data. The difference between current height and desired height can make one access the numeric controls logic, or the errors computation. This characteristic is intrinsic in the matrix: substantially, there are current coordinates and desired coordinates for $T_0$, $T_1$, $T_2$, ..., $T_n$. All parameters treated in the matrix create pairs of values XY for a time instant $T_0$, $T_1$, $T_2$, ..., $T_n$. The process then photographs the situation in which the wing airfoil is, and transforms the plane P in FIG. 5 into numbers and coordinates. Taking into account, for example, the height problem, the matrix value $QX_0Y_0$ points out a point in the neighbourhood of the height parameter, tending to the centre of the graph of height Q in FIG. 5. The circular shape makes all agree in times, in which the trend is clear: rise in $T_1$, $T_2$. In case of traction, the process could already compute the evolution of the ideal point in time: the form of the desired data therefore is not circular.

Obviously, the relative weight $P_Q$, $P_C$, $P_M$, $P_{ZI}$, $P_T$ of every related parameter Q, C, M, ZI, T can be settable, and such setting can be dynamic (retroactive). By analysing, for example, the mean error of the desired height with respect to the current height, etc., the process can be aware of the most difficult parameters to be satisfied. A retroactive process corrects the weights of the most critical parameters, in such a way as to make decisions about such parameters more important. This type of error can be given a measure, for example a percentage measure, standardised for every parameter with respect to a maximum error value. For example, if in time the counterweight is always outside the dynamics centre and risks to arrive to its end-of-stroke, this standardisation allows locating which is the parameter that makes most mistakes. It can be an independent process which adjusts the weights of each parameter.

Once having collected the best coordinates for each parameter, the process provides for a step in which the vector sum of all coordinates at time $T_0$ is computed. The resulting vector is $RX_0Y_0$, which is still not the direction of the flight trajectory in which the wing airfoil has to be moved, since the forecast for the future is still to be considered. The process then computes the vectorial sums for all future steps $RX_1Y_1$, $RX_2Y_2, \ldots, RX_nY_n$ and time weights $PT_0, PT_1, PT_2, \ldots, PT_n$, are then introduced, which give priority to short-term strategies, at the same time avoiding to take the wing airfoil in potentially critical areas.

Obviously, also the time weights $PT_0, PT_1, PT_2, \ldots, PT_n$ can be settable.

Through the computation of the matrix in Table 1, the process of the present invention locates an ideal instantaneous coordinate (target) to which one tends with the manoeuvre of the wing airfoil along its flight trajectory. Once having found the ideal coordinate, it is necessary to take care of the manoeuvre and of the control of the driving cables in order to make the wing airfoil reach its target. The process then comprises a step of choosing the best path (shortest path, by-passing the interdiction areas, etc.) in order to take the wing airfoil from the current position to the target. In this step, therefore, the process decides, depending on the target to be reached, the best flight trajectory for reaching it minimising the time, since being with the wing airfoil always correctly on the target sequence located as best, is a guarantee of producing the maximum energy under maximum safety and the maximum compliance with dynamic specifications. The hearth of the problem in this step is how transferring the target coordinates in traction. The step of choosing the best path therefore uses an Inertial Navigation System (INS) supported by a dynamic model of the wing airfoil (FVM) taking into account wing airfoil flight equations and inertias, together with the percentage of reaction which it can have depending on the traction differential on cables. Inertias and traction describe the manoeuvre law of the wing airfoil; it is suitable to take into account the (predictive) evaluations of the best path, by evaluating all possible paths and evaluating the manoeuvre with a decision tree. In this step, apparent speeds and tractions are taken into account, and it is possible to accurately evaluate the best path strategy. Synergy between inertial navigation and information given by dynamic modelling, namely the motion model obtained from the history of the wing airfoil positions, from control inputs and from forces operating on the wing airfoil itself has been widely demonstrated in the past by using dynamic equations of the vehicle. These studies demonstrate that the main advantage in using a vehicle model is the improvement of the capability to observe the error sources in the INS.

In the Inertial Navigation System INS, position ($\rho_n$), speed ($v_n$) and Eulero angles ($\psi$) of the wing airfoil, referred to a reference system n=[N, E, D] (North, East, Down) are computed as follows:

$$\dot{p}_n = v_n$$

$$\dot{v}_n = C_b^m f_b + g_n$$

$$\dot{\Psi} = E_b^n \omega_b$$

where $g_n$ is the gravity acceleration, $f_b$ is the acceleration vector on the three axes, $\omega_b$ is the rotation. $C''_b$ and $E''_b$ are respectively the transformation and rotation matrices, defined as follows:

$$C_b^m = \begin{bmatrix} c_\psi c_\theta & c_\psi s_\theta s_\phi - s_\psi c_\phi & c_\psi s_\theta c_\phi + s_\psi s_\phi \\ s_\psi c_\theta & s_\psi s_\theta s_\phi + c_\psi c_\phi & s_\psi s_\theta c_\phi - c_\psi s_\phi \\ -s_\theta & c_\theta s_\phi & c_\theta c_\phi \end{bmatrix}$$

$$E_b'' = \begin{bmatrix} 1 & s_\phi t_\theta & c_\phi t_\theta \\ 0 & c_\phi & -s_\phi \\ 0 & s_\phi \sec_\theta & c_\phi \sec_\theta \end{bmatrix}$$

where s(.), c(.) and t(.) represent sen(.), cos(.) and tan(.), while $\Psi=[\phi, \theta, \psi]$ are the Eulero angles.

The dynamic model of the wing airfoil (FVM) with six degrees of freedom is instead composed of a set of equations which provide for state variables of the wing airfoil, composed of position, speed, Eulero angles and rotations by means of the control variables of the wing airfoil, which are assumed as known from system 1. The movement of the wing airfoil can be described by the following system of movement equations, in which the forces operating on the vehicle are function of wing airfoil position, speed, Eulero angles and current rotation:

$$\dot{u} = rv - qw + g_x + [Fx/m]$$

$$\dot{v} = pw - ru + g_y + [F_y/m]$$

$$\dot{w} = qu - pv + g_z + [F_z/m]$$

$$\dot{p} = C_3 pq + C_4 qr + C_1 l + C_2 N$$

$$\dot{q} = C_7 pr - C_6(p^2 - r^2) + C_5 M$$

$$\dot{r} = C_9 pq - C_3 qr + C_2 l + C_8 N$$

where $v_b=[u, v, w]$ are the speed components along the three axes in the wing airfoil reference system, $\omega_b=[p, q, r]$ are the wing airfoil rotations, $F_x$, $F_y$, $F_z$ and I, M, N are the components of the force and of the moments acting on the wing airfoil along its own axes. $g_x$, $g_y$, $g_z$ are the components of the gravity acceleration vector decomposed in the wing airfoil reference system, whose mass is designated as m. Coefficients $C_{0-9}$ are obtained starting from the inertia matrix I.

For example, there can be two methods through which the dynamic model of the wing airfoil FVM can be applied as support to the Inertial Navigation System: a first method implies the comparison and correction of speed and attitude of the wing airfoil such as are obtained, independently, from INS and from FVM. The second method uses the acceleration and rotation forecast performed by the FVM in order to realise a direct calibration of the Inertial Measuring Unit (IMU). In both cases, the INS processes wing airfoil position, speed and Eulero angles (which describe the rotation) for integrating acceleration and rotation measures provided by the IMU on board the wing airfoil. In the first method, however, the wing airfoil model computes wing airfoil speed and angles by using the control inputs of the aircraft itself. Moreover, the real implementation of FMV and INS takes advantage from the application of the most recent developments of the mathematics based on quaternions. Task of an Extended Kalman Filter (EKF) is evaluating INS and FVM errors by observing the differences between speed and angles data respectively produced by INS and FVM.

In the second method, instead, the FMV is used for computing acceleration and rotation estimation directly from control inputs. The input of the Extended Kalman Filter is therefore composed of differences between acceleration and rotation estimations computed by FVM and those read from used sensors. The EKF is therefore used for estimating acceleration and rotation errors of sensors and FVM, which are then used for consequently correcting sensors and FVM.

The wing airfoil manoeuvre has however the problem of being calibrated. It is true that one can decide the amount of manoeuvre, but the amount remains to be defined. There is in fact the risk of oscillating, in an excessive gain, due to inertial causes, kinematic chain elasticity (winches are on the ground, the manoeuvre occurs in air) and measurement delay (neglectable). There is therefore the risk of performing non-calibrated, insufficient or exaggerated manoeuvres, which compel to perform continuous corrections (opposite compensation), with the risk of uncontrollably oscillating. In order to solve this group of problems, the control art has already devised techniques such as Hinf and the already mentioned Kalman Filters, which consider the actuation delay as one of the disturbances, one of the noises which the control must manage, by optimising the manoeuvre and limiting it with filters and methodologies which are calibrated on the system or self-calibrating. The described process of the present invention can be equipped with predictive capabilities whose time depth is function of the information processing power of the system of the present invention. The other major characteristic which allows forecasting the above described problems is that the processing and controlling means receive acceleration-related information. An excessive manoeuvre is therefore perceived largely beforehand with respect to when the movement occurs and this should bring the system to a sub-critical situation, in which oscillations can be not triggered due to the capability of sensors of providing data 180° in advance of the movement. Should a position data be directly available, a new operation would be performed once damage has been done, while the acceleration announces the damage.

Due to what has been stated above, the process of the present invention therefore comprises the steps of:

a) detecting the first pieces of information 3a through the first detecting means 3 related to a current instant of the flight trajectory of the wing airfoil; possibly re-processing all or part of the first pieces of information 3a through the pre-processing means 11 to obtain the pre-processed first pieces of information 3a';

b) detecting the second pieces of information 5a through the second detecting means 5a related to a current instant of the flight trajectory of the wing airfoil;

c) sending through the transmission system the first pieces of information 3a, 3a' to the processing and controlling means 7, in particular to the geometrical motor 7a;

d) sending the second pieces of information 5a to the processing and controlling means 7, in particular to the geometrical motor 7a;

e) from the first 3a, 3a' and the second pieces of information, directly or indirectly obtaining values related at least to current position XY and current flight height of the wing airfoil, to counterweight dynamics, and to traction on driving cables;

f) defining flight and control parameters, such as for example height Q, counterweight dynamics C, manoeuvre M, interdiction areas ZI, Traction T of the driving cables; possibly defining a tolerance for each one of such parameters;

g) defining a relative weight $P_Q$, $P_C$, $P_M$, $P_{ZI}$, $P_T$, for each one of the flight and control parameters;

h) computing for each parameter the best coordinates XY in following times $T_0, T_1, T_2, \ldots, T_n$;

i) computing the vectorial sum $RX_0Y_0$ of all coordinates at time $T_0$;

j) computing the vectorial sums $RX_1Y_1, RX_2Y_2, \ldots, RX_nY_n$ for all future times $T_1, T_2, \ldots, T_n$;

k) defining and applying the time weights $PT_0$, $PT_1$, $PT_2, \ldots, PT_n$, for the vectorial sums;

l) choosing the best among $RX_1Y_1, RX_2Y_2, \ldots, RX_nY_n$ as ideal instantaneous coordinate (target) to which the wing airfoil manoeuvre must tend;

m) choosing the best flight trajectory path $TV_1$, $TV_2$, $TV_3, \ldots, TV_n$, to take the wing airfoil from the current position to the target;

n) taking the wing airfoil from the coordinates of the current position to the target by acting on the driving unit through the numeric control 7b of the system 1; preferably using an Inertial Navigation System (INS) supported by a dynamic model of the wing airfoil (FVM);

o) repeating the steps a) to n) at every time interval Δt defined as control loop frequency; it can be provided that the process of the present invention also comprises a step of retroactively adjusting the length of Δt, making de facto the loop frequency adjustable. If Δt is short, the process will perform an accurate and detailed, but possibly exuberant and scarcely far-sighted, short-term predictive analysis, since the n steps possible in time do not globally reach an optimum time distance from the current instant: it becomes therefore necessary to relate the steps of forecasting the future with the step length, in order to optimise the time depth of the flight path of the wing airfoil to be performed. It is therefore suitable to evaluate the opportunity of performing a forecast which covers too much in the future: it is reasonable to assume that providing more than one revolution of the "carousel" system is useless, since, under stability conditions, the situation is repeated. The ideal length of Δt is probably the one which corresponds to the length of a complex manoeuvre, such as the azimuth gybing of the wing airfoil.

The invention claimed is:

1. A process for automatically controlling the flight of at least one power wing airfoil, through a system for automatically controlling a flight of at least one power wing airfoil, the at least one power wing airfoil being controlled by a driving unit equipped with two winches to which the power wing airfoil is connected by means of two respective driving cables, the system comprising:

first detecting means on board of the power wing airfoil programmed to detect first pieces of information dealing with at least one position and one orientation in space of the power wing airfoil and accelerations to which the power wing airfoil is subjected;

second detecting means on the ground programmed to detect second pieces of information dealing with at least one amount of a tension on the driving cables of the power wing airfoil and a position of a counterweight of the driving unit;

processing and controlling means for the first and the second pieces of information, programmed to transform a contents of the pieces of information into a mechanical drive operating on the winches of the driving unit to drive the power wing airfoil along a flight trajectory $TV_1$, $TV_2$, $TV_3$, ..., $TVn$ maximising a lift effect generated on the power wing airfoil by an Aeolian current W in which it is immersed and maximising an amount of kinetic energy subtracted to the Aeolian current W; and a system for transmitting the first pieces of information to the processing and controlling means, the process comprising the steps of:

a) detecting the first pieces of information through the first detecting means related to a current instant of a flight trajectory of the wing airfoil;

b) detecting the second pieces of information through the second detecting means related to a current instant of a flight trajectory of the wing airfoil;

c) sending through the transmission system the first pieces of information to the processing and controlling means:

d) sending the second pieces of information to the processing and controlling means:

e) from the first and second pieces of information directly or indirectly obtaining values related at least to one current position XY and one current flight height of the wing airfoil, to a dynamics of the counterweight, and to a traction on the driving cables:

f) defining flight and control parameters:

g) defining a relative weight $P_Q$, Pc, $P_M$, $P_{Z1}$, $P_T$, for each one of the flight and control parameters:

h) computing, for each one of the parameters, the best coordinates XY in following times $T_0$, $T_1$, $T_2$ ... $T_n$;

i) computing a vectorial sum $RX_0Y_0$ of all coordinates at the time $T_0$:

j) computing the vectorial sums $RX_1Y_1$, $RX_2Y_2$, ..., $RX_nY_n$ for all future times $T_1$, $T_2$, ..., $T_n$;

k) defining and applying time weights $PT_0$, $PT_1$, $PT_2$, ..., PTn for the vectorial sums;

l) choosing a best one among the vectorial sums $RX_1Y_1$, $RX_2Y_2$, ..., $RX_nY_n$ as ideal instantaneous coordinate or target to which a maneuver of the wing airfoil tends:

m) choosing a best path of a flight trajectory $TV_1$, $TV_2$, $TV_3$, ..., TVn, to take the wing airfoil from the current position to the target:

n) taking the wing airfoil from the coordinate of the current position to the target by acting on the driving unit through the numeric control:

o) repeating the steps a) to n) at every time interval $\Delta t$.

2. The process of claim 1, wherein the processing and controlling means comprise a processor programmed to process the first pieces of information in order to return position, acceleration and orientation information of the wing airfoil to a numeric control programmed to operate on the winches of the driving unit for controlling a traction force on the driving cables.

3. The process of claim 2, wherein the transmission system transmits the first pieces of information to the geometrical motor.

4. The process of claim 1, wherein the first detecting means comprise three-axes accelerometers.

5. The process of claim 4, wherein the three-axes accelerometers are of the MEMS type.

6. The process of claim 4, wherein each one of two of the three-axes accelerometers is placed in a respective end of the wing airfoil next to a union of the driving cables with the walls of the wing airfoil.

7. The process of claim 1, wherein the first detecting means comprise an electronic compass.

8. The process of claim 7, wherein the electronic compass is a Fluxgate magnetometer.

9. The process of claim 1, wherein the second detecting means comprise strain gauges programmed to measure a deflection of the driving cables.

10. The process of claim 1, wherein the second detecting means comprise encoders on the winches of the driving unit.

11. The process of claim 1, wherein the second detecting means comprise proximity sensors.

12. The process of claim 1, wherein the second detecting means comprise a ground artificial vision system.

13. The process of claim 1, wherein the first or second detecting means comprise virtual sensors.

14. The process of claim 1, wherein the transmission system is integrated in the driving cables of the wing airfoil through at least one data optical fiber.

15. The process of claim 1, wherein the driving cables have a wing airfoil-shaped section.

16. The process of claim 1, wherein the transmission system is of the radio-frequency type.

17. The process of claim 1, wherein the transmission system is of the ultrasound type.

18. The process of claim 1, wherein the transmission system uses a continuous monodirectional stream protocol.

19. The process of claim 1, wherein the transmission system uses a datagram packets protocol.

20. The process of claim 1, wherein the transmission system uses a negotiated asynchronous transport protocol.

21. The process of claim 1, wherein the system comprises pre-processing means programmed to perform a pre-processing of all or part of said first pieces of information on board of said wing airfoil to provide pre-processed first pieces of information.

22. The process of claim 1, wherein the system comprises at least one supplying system of the first detecting means and of the transmission system on board of the wing airfoil.

23. The process of claim 22, wherein the supplying system comprises photovoltaic thin-film modules on a plastic support applied on the wing airfoil.

24. The process of claim 22, wherein the supplying system comprises an Aeolian micro-turbine keyed-in on a permanent magnet generator.

25. The process of claim 1, the process comprising, between step a) and step b), the step of pre-processing all or part of the first pieces of information through the pre-processing means in order to obtain pre-processed first pieces of information.

26. The process of claim 1, wherein the flight and control parameters are height Q, dynamics of the counterweight C, maneuver M, interdiction areas ZI, and traction T of the driving cables.

27. The process of claim 1, wherein the step f) comprises the step of defining a tolerance for each one of the parameters.

28. The process of claim 1, wherein the step m) uses an Inertial Navigation System (INS) supported by a dynamic model of the wing airfoil (FVM).

29. The process of claim 1, the process comprising an emergency step to point out to the wing airfoil which maneuver must be performed with maximum priority.

30. The process of claim 1, the process comprising the step of retroactively correcting the flight and control parameters.

31. The process of claim 1, the process comprising the step of calibrating the maneuver through Hinf techniques or Kalman filters.

32. The process of claim 1, the process comprising the step of retroactively adjusting a length of the time interval $\Delta t$.

* * * * *